(12) United States Patent
Carnevale et al.

(10) Patent No.: US 7,225,364 B2
(45) Date of Patent: May 29, 2007

(54) METHOD AND APPARATUS FOR IMPLEMENTING INFINIBAND RECEIVE FUNCTION

(75) Inventors: Michael Joseph Carnevale, Rochester, MN (US); Charles Scott Graham, Rochester, MN (US); Daniel Frank Moertl, Rochester, MN (US); Timothy Jerry Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 10/388,071

(22) Filed: Mar. 13, 2003

(65) Prior Publication Data

US 2004/0193768 A1 Sep. 30, 2004

(51) Int. Cl.
*G06F 11/00* (2006.01)
(52) U.S. Cl. .................................. 714/43; 370/412
(58) Field of Classification Search .................. 714/43
See application file for complete search history.

(56) References Cited

U.S. PATENT DOCUMENTS 6,898,752 B2 * 5/2005 Tucker ....................... 714/752
6,904,545 B1 * 6/2005 Erimli et al. ................. 714/43
2003/0091055 A1 * 5/2003 Craddock et al. ........... 370/412
2003/0226085 A1 * 12/2003 Tucker ....................... 714/752
2004/0120336 A1 * 6/2004 Hendel et al. .............. 370/412
2004/0153849 A1 * 8/2004 Tucker et al. ................ 714/43

* cited by examiner

*Primary Examiner*—Robert Beausoliel
*Assistant Examiner*—Christopher McCarthy
(74) *Attorney, Agent, or Firm*—Joan Pennington

(57) ABSTRACT

A method, apparatus, and computer program product are provided for implementing a receive function over an interconnect network, such as InfiniBand. A virtual lane (VL) with a pending packet for a queue pair (QP) is selected. Then the pending packet is checked for an exceptional condition. Responsive to identifying the exceptional condition for the pending packet, a state bit is set for freezing the selected VL; and an interrupt is generated to firmware. Responsive to receiving the interrupt, the firmware determines a cause for freezing the selected VL and performs a responsive action. For example, the responsive action performed by firmware includes firmware performing an error recovery procedure (ERP) for the QP; firmware updating a state for the QP; or firmware performing application unique processing for the QP.

20 Claims, 4 Drawing Sheets

METHOD AND APPARATUS FOR IMPLEMENTING INFINIBAND RECEIVE FUNCTION

FIELD OF THE INVENTION

The present invention relates generally to the data processing field, and more particularly, relates to a method, apparatus, and computer program product for implementing a receive function over an interconnect network, such as InfiniBand.

DESCRIPTION OF THE RELATED ART

Input/output (I/O) networks, such as system buses, can be used for the processor of a computer to communicate with peripherals such as network adapters. However, constraints in the architectures of common I/O networks, such as the Peripheral Component Interface (PCI) bus, limit the overall performance of computers. As a result new types of I/O networks have been introduced.

One new type of I/O network is known and referred to as the InfiniBand network. The InfiniBand network replaces the PCI or other bus currently found in computers with a packet-switched network, complete with zero or more routers. A host channel adapter (HCA) couples the processor to a subnet, and target channel adapters (TCAs) couple the peripherals to the subnet. The subnet typically includes at least one switch, and links that connect the HCA and the TCAs to the switches. For example, a simple InfiniBand network may have one switch, to which the HCA and the TCAs connect through links. Topologies that are more complex are also possible.

InfiniBand networks can interconnect with communication networks. For instance, an Ethernet network adapter may be installed that enables communication over an Ethernet network, which is a common type of communication network. The network adapter has its own TCA for coupling to an InfiniBand network. The InfiniBand specification provides a raw datagram mode of communication to bridge packets received from an Ethernet network for transmission over an InfiniBand network, and vice-versa.

InfiniBand networks provide for communication between TCAs and HCAs in a variety of different manners. In the InfiniBand network data flows between end nodes on logical connections known as Queue Pairs (QPs) across a switched point-to-point fabric. Like other types of networks, InfiniBand networks have a physical layer, a link layer, a network layer, a transport layer, and upper-level protocols. As in other types of packet-switching networks, in InfiniBand networks particular transactions are divided into messages, which themselves are divided into packets for delivery over an InfiniBand network. When received by the intended recipient, the packets are reordered into the constituent messages of a given transaction. InfiniBand networks provide for queues and channels at which the packets are received and sent.

InfiniBand networks allow for a number of different transport services, including reliable and unreliable connections, reliable and unreliable datagrams, and raw packet support. In unreliable connections and datagrams, acknowledgments are not generated, and packet ordering is not guaranteed. In reliable connections and datagrams, acknowledgments and packet sequence numbers for guaranteed packet ordering are generated. Duplicate packets are rejected, and missing packets are detected.

In an InfiniBand (IB) communication fabric, data flows between end nodes on logical connections known as Queue Pairs (QPs) across a switched point-to-point fabric. For best latency and throughput performance characteristics, it is desirable for packets to be handled completely in hardware without requiring firmware intervention. However, this leads to a complex and expensive hardware implementation that is difficult to design and debug.

SUMMARY OF THE INVENTION

A principal object of the present invention is to provide a method, apparatus, and computer program product for implementing a receive function over an interconnect network, such as InfiniBand. Other important objects of the present invention are to provide such method, apparatus, and computer program product for implementing a receive function substantially without negative effect and that overcome some of the disadvantages of prior art arrangements.

In brief, a method, apparatus, and computer program product are provided for implementing a receive function over an interconnect network, such as InfiniBand. A virtual lane (VL) with a pending packet for a queue pair (QP) is selected. Then the pending packet is checked for an exceptional condition. Responsive to identifying the exceptional condition for the pending packet, a state bit is set for freezing the selected VL; and an interrupt is generated to firmware.

In accordance with features of the invention, responsive to receiving the interrupt, the firmware determines a cause for freezing the selected VL and performs a responsive action. For example, the responsive action performed by firmware includes firmware performing an error recovery procedure (ERP) for the QP; firmware updating a state for the QP; or firmware performing application unique processing for the QP.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
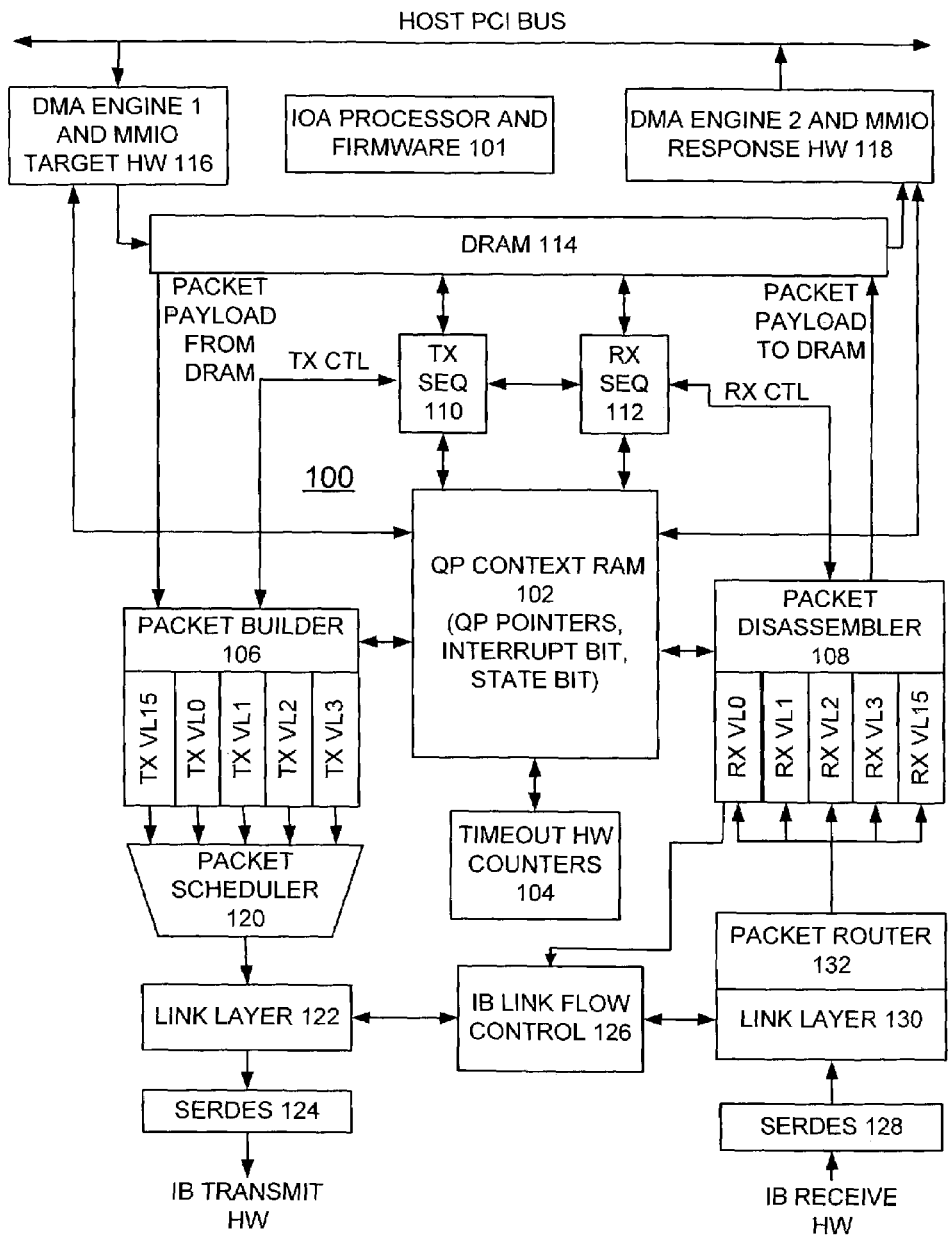
FIG. 1 is a block diagram representation illustrating an InfiniBand (IB) apparatus for implementing a receive function over an interconnect network in accordance with the preferred embodiment.

Having reference now to the drawings, in FIG. 1, there is shown a network system generally designated by the reference character 100 for implementing a receive function over an interconnect network in accordance with the preferred embodiment. Network system 100 complies with InfiniBand requirements and is described generally as InfiniBand (IB) input/output adapter (IOA) 100; however, it should be understood that the present invention is not limited to InfiniBand networks and can be used for various other I/O network requirements.

FIG. 1 illustrates an application specific integrated circuit (ASIC) defining network system 100 that handles the transmission and reception of InfiniBand (IB) packets (messages). An input/output adapter (IOA) processor and firmware 101 is provided with the IB IOA 100 for implementing receive function methods of the invention. IOA processor and firmware 101 can be implemented with an embedded or a separate processor together with integral or associated read only memory (ROM) storing microcode and data in accordance with the preferred embodiment. It should be understood that the present invention is not limited to a particular arrangement of the IOA processor and firmware 101.

As shown in FIG. 1, the IOA 100 includes a queue pair (QP) context random access memory (RAM) 102 connected to timeout hardware (HW) counters 104, a packet builder 106 and a packet disassembler 108. The QP context RAM 102 stores a set of queue pointers for each queue pair (QP).

In accordance with features of the preferred embodiment, the QP context RAM 102 stores an interrupt bit for interrupting IOA firmware 101 when an exceptional event occurs and normal processing of the particular VL buffer halts or freezes. The QP context RAM 102 stores a state bit used for freezing the particular VL buffer when such an exceptional event occurs.

IOA 100 includes a transmit sequencer 110 coupled to the QP context RAM 102 and to the packet builder 106. A receive sequencer 112 is coupled to the local QP context RAM 102 and to the packet disassembler 108. A dynamic random access memory (DRAM) 114 for storing packet payload data is coupled to the transmit sequencer 110, the receive sequencer 112, the packet builder 106, and the packet disassembler 108. IOA 100 includes a first direct memory access (DMA) engine 1 and memory mapped I/O (MMIO) target HW 116 and a second DMA engine 2 and MMIO response HW 118 coupled to a host bus, such as a host PCI bus and DRAM 114. Messages are received from a host operating system (OS) and payload data are transferred to and from the host PCI bus and the DRAM 114. DMA engine 1 and MMIO target HW 116 and DMA engine 2 and MMIO response HW 118 are coupled to the QP context RAM 102. MMIO target HW 116 allows the host OS to write ASIC registers and RAMs. MMIO response HW 118 allows the host OS to read ASIC registers and RAMs.

Packet builder 106 is coupled to InfiniBand (IB) transmit hardware via a packet scheduler 120, a link layer 122, and a serializer-deserializer (SERDES) 124. Packet payload data are transferred from the DRAM 114 to the packet builder 106. An IB link flow control 126 is coupled to the link layer 122 and the packet disassembler 108. Packet disassembler 108 is coupled to IB receive hardware via a SERDES 128, a link layer 130, and a packet router 132. IB link flow control 126 is coupled to the link layer 130. Packet payload data are transferred from the packet disassembler 108 to the DRAM 114. As shown in FIG. 1, packet builder 106 includes a plurality of transmit (TX) virtual lanes (VLs) and packet disassembler 108 includes a plurality of receive (RX) VLs for multiple queue pairs (QPs).

Quality of Service (QOS) mechanisms provided by, for example, by the IB architecture allow varying QOS characteristics. Each QP is assigned to one of 16 Service Levels (SLs), and the SL determines which Virtual Lane (VL) is used across any given link in the network. Multiple QPs can and typically are assigned to the same SL and hence the same VL. The VLs utilize flow control across each link. This flow control is on a per VL basis with the VLs not being dependent on each other. QOS is handled fully by the transmitting side of the link or QP, not the receiver, and is determined by the transmitter deciding which VL should have a packet transmitted next.

In accordance with features of the preferred embodiment, a novel usage of the Quality of Service (QOS) mechanisms provided by, for example, by the IB architecture enables a much simpler, lower cost hardware design for IOA 100 while maintaining the performance advantages of the more complex hardware design. This invention enables the movement of complex transport level error recovery to firmware 101, and also enables application unique processing to be specified on a per QP basis. The result is a lower cost design for IOA 100 with equivalent performance that can be readily customized and is easier to design, implement, and debug. These features and advantages are further described below.

In accordance with features of the invention, defined IB behavior is used, not for QOS reasons, but instead to enable a much simpler hardware implementation along with several additional advantages. Each VL is processed independently of the other VLs, and contains separate VL buffer. This VL buffer acts like a first-in first-out (FIFO) buffer. As packets are received from the IB link they are placed into the buffer, and processed in the order they were received. Processing is normally done completely in hardware of IOA 100. However, when an exceptional event occurs the processing of this VL buffer halts with the packet which caused the event remaining in the VL buffer, and an interrupt is raised to firmware 101.

In accordance with features of the preferred embodiment, the trigger conditions that cause a VL to be halted are configurable, and can vary between VLs and also between QPs. One trigger condition that causes a VL to halt is whenever a complex error condition is detected, and thus allowing the movement of the processing of the complex error condition to firmware 101. This capability also allows the trigger detected to be used as a built-in debug facility to allow for debug and a customizable trace. A trigger condition can be used to avoid undesirable effects of a hardware flaw or design defect, enabling an additional progress and using hardware with some logic deficiencies. One other notable possible usage is as a hook to enable application-unique processing on a per QP basis, with different triggers possible for each QP depending on the type of application using the particular QP connection. This enables new unique applications and processing to be developed without requiring additional hardware development.

Figure 2:
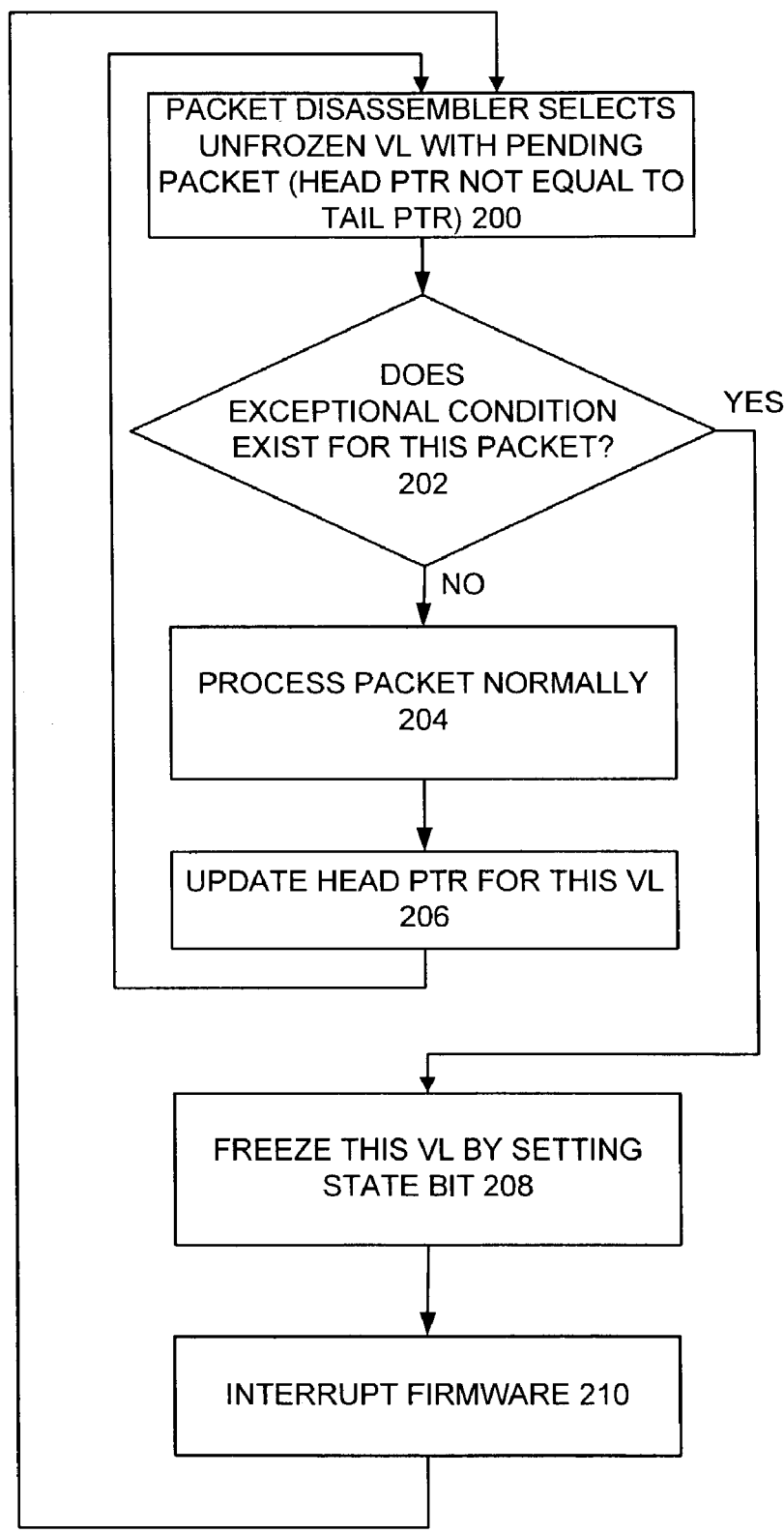
FIGS. 2, and 3 are diagrams illustrating receive function operations of the apparatus of FIG. 1 in accordance with the preferred embodiment.
Figure 3:
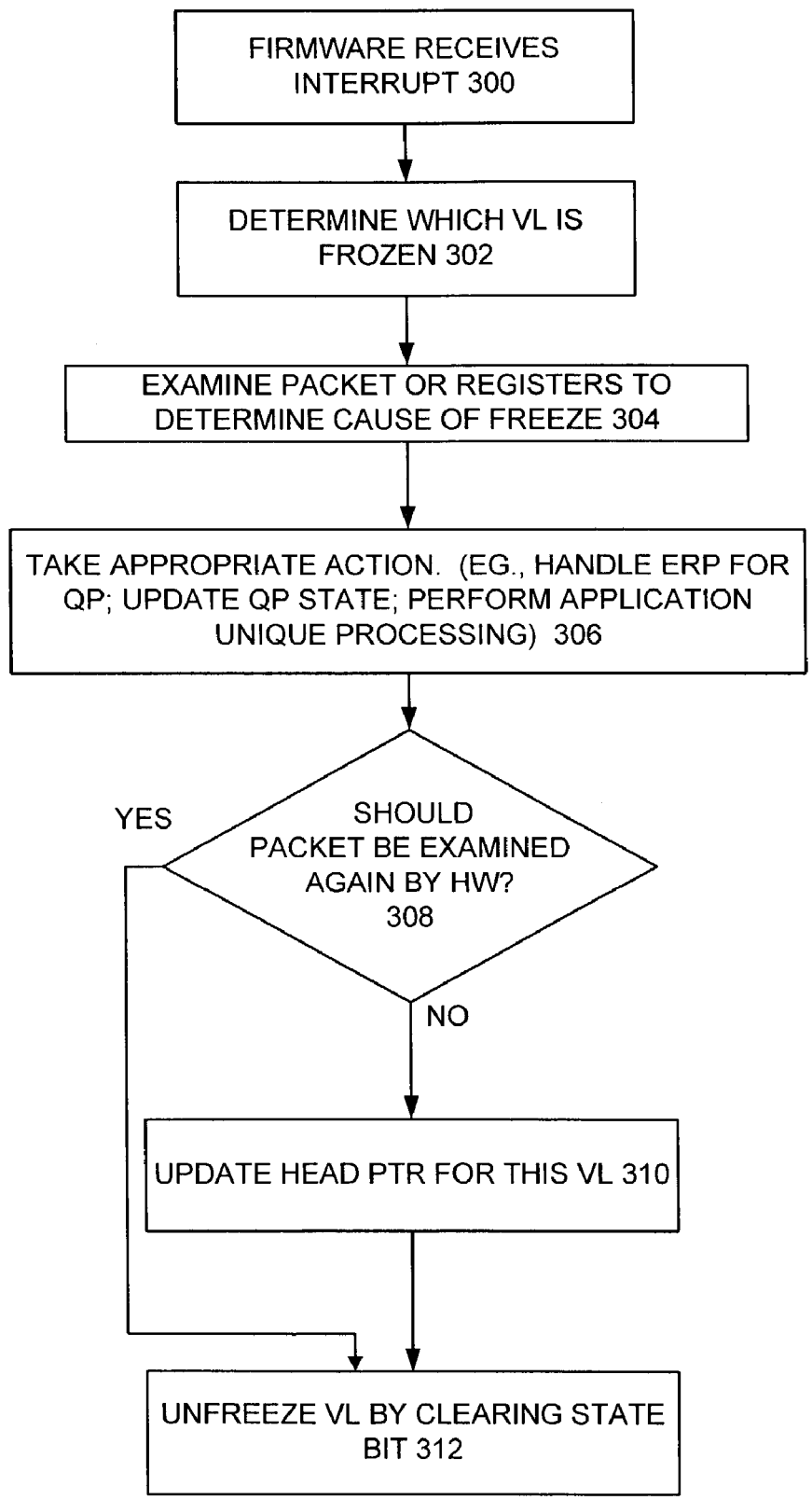

Referring now to FIGS. 2 and 3, there are shown flow charts illustrating receive function operations of IOA 100 and IOA processor and firmware 101 in accordance with the preferred embodiment.

Referring to FIG. 2, there are shown exemplary steps performed by the IOA 100 in accordance with the preferred embodiment. The packet disassembler 108 selects an unfrozen VL with a pending packet, for example, with the head pointer not equal to the tail pointer, as indicated in a block 200. Checking whether an exceptional condition exists for this packet is performed as indicated in a decision block 202. When an exceptional condition does not exist for this packet, then the packet is processed normally as indicated in a block 204. The head pointer is updated for this VL as indicated in a block 206. Then the sequential steps return to block 200 to select a next unfrozen VL.

When an exceptional condition exists for this packet, then the VL is frozen by setting the state bit in the QP context RAM 102 as indicated in a block 208. Firmware 101 is interrupted as indicated in a block 210, for example, by setting the interrupt bit in the QP context RAM 102. Then the sequential steps return to block 200 to select a next unfrozen VL.

In accordance with features of the preferred embodiment, new packets arriving for the QP causing the VL to be frozen or halted at block 208 or packets arriving for other QPs also using the halted VL continue to be received as normal and placed into the FIFO. Further processing of these additional packets for this VL is deferred since the VL is halted. If the FIFO becomes full, hardware automatically stops providing link credits to other side of the link for the VL, asserting backpressure and forcing transmission to pause for this VL. Note that link credits are not immediately suppressed, and instead are stopped only if required to minimize any disruption. If sufficient buffer resources are available, then link credits might not need to be suppressed before the VL is released from the halted state. During this process no packets are dropped or require transmittal since the flow control stopped transmission for this VL once the buffer became full so there is no catastrophic impact to other QPs. Even if transmission of traffic for this VL is halted due to the FIFO filing, the overall link throughput and utilization is maintained because packets can still be transmitted to other VLs so there is no overall performance degradation.

Referring now to FIG. 3, there are shown exemplary steps performed by the IOA processor and firmware 101 in accordance with the preferred embodiment. First firmware 101 receives an interrupt as indicated in a block 300. Then firmware 101 determines which of the VLs and the QP which caused the VL to be frozen or halted as indicated in a block 302. The packet which caused the interrupt remains at the front of the FIFO since the packet disassembler hardware 108 is quiesced now for this VL. Firmware 101 then examines the packet at the head of that VL to determine the cause for the freeze, or alternatively, hardware may have saved away the cause of the freeze in a register or registers dedicated to this VL that are examined to determine the cause for the freeze as indicated in a block 304. Firmware 101 will then take the appropriate action to handle the trigger condition that caused the VL to be frozen as indicated in a block 306.

For example, the action taken at block 306 includes handling an error recovery procedure (ERP) for the QP; updating the state of the QP to properly handle an error encountered by that QP; and performing application unique processing. This allows the hardware, such as packet disassembler 108, to delegate the handling of complex error conditions to firmware 101, thus simplifying the hardware design while still allowing most operations to be handled completely by hardware of IOA 100.

When firmware 101 has finished processing the appropriate action at block 306, checking whether the packet should be examined again by HW is performed as indicated in a decision block 308. If not, firmware 101 simply increments the head pointer of the VL FIFO to point to the next packet as indicated in a block 310 and turns the freeze bit off to unfreeze the VL as indicated in a block 312. Hardware or packet disassembler 108 will then automatically restart with the next packet for this VL. If firmware 101 desired hardware or packet disassembler 108 to reexecute the processing for the faulting packet, for example, after firmware 101 has made updates to the QP state or made application unique changes to the received packet, firmware 101 simply turns the state or freeze bit off at block 310 without incrementing the head pointer. Hardware or packet disassembler 108 will then begin processing for this VL by again processing the faulting packet.

Occasionally multiple VLs could have exceptional events occur closely in time, and are halted concurrently. This is not expected to occur often because exceptional events are seen as infrequent, however, it needs to be properly handled if it does occur. With the present invention, this is seamlessly handled because the VLs are processed independently, and no additional provisions are required to handle this condition.

Figure 4:
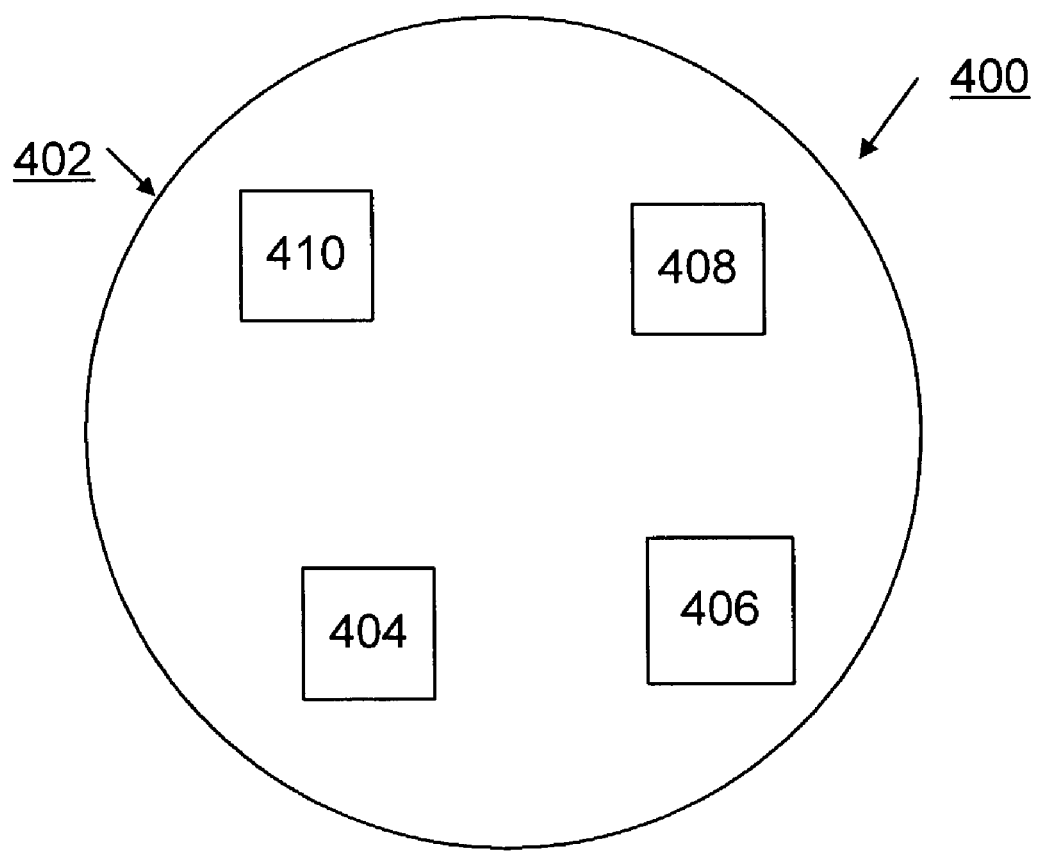
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for implementing a receive function over an interconnect network of the preferred embodiment in the system 100 of FIG. 1.

A sequence of program instructions or a logical assembly of one or more interrelated modules defined by the recorded program means 404, 406, 408, 410, direct the computer system 100 for implementing a receive function over an interconnect network of the preferred embodiment.

While the present invention has been described with reference to the details of the embodiments of the invention shown in the drawing, these details are not intended to limit the scope of the invention as claimed in the appended claims.

What is claimed is:

1. A method for implementing a receive function over an interconnect network comprising the steps of:
   selecting a virtual lane (VL) with a pending packet for a queue pair (QP);
   checking for an exceptional condition for the pending packet;
   responsive to identifying said exceptional condition for the pending packet, setting a state bit for freezing said selected VL; and generating an interrupt to firmware.

2. A method as recited in claim 1 wherein said firmware responsive to receiving said interrupt, determines a cause for freezing said selected VL.

3. A method as recited in claim 2 wherein the step of said firmware determining said cause for freezing said selected VL includes the step of examining the pending packet having said exceptional condition for determining said cause of said freezing said selected VL.

4. A method as recited in claim 2 wherein the step of said firmware determining said cause for freezing said selected VL includes the step of examining a hardware register for determining said cause of said freezing said selected VL.

5. A method as recited in claim 2 wherein said firmware responsive to determining said cause of said freezing said selected VL, performs a responsive action.

6. A method as recited in claim 5 wherein the step of said firmware performing said responsive action includes the steps of performing an error recovery procedure (ERP) for the QP.

7. A method as recited in claim 5 wherein the step of said firmware performing said responsive action includes the steps of updating a state for the QP.

8. A method as recited in claim 5 wherein the step of said firmware performing said responsive action includes the steps of performing application unique processing for the QP.

9. A method as recited in claim 5 includes the steps responsive to said firmware performing said responsive action, of clearing said state bit for unfreezing said selected VL.

10. A method as recited in claim 5 includes the steps responsive to said firmware performing said responsive action, of updating a head pointer for said selected VL to process a next packet for said selected VL.

11. A computer program product for implementing a receive function in an interconnect network system, said computer program product including a plurality of computer executable instructions stored on a computer readable medium, wherein said instructions, when executed by the network system, cause the network system to perform the steps of:
   selecting a virtual lane (VL) with a pending packet for a queue pair (QP);
   checking for an exceptional condition for the pending packet;
   responsive to identifying said exceptional condition for the pending packet, setting a state bit for freezing said selected VL; and generating an interrupt to firmware; and
   said firmware responsive to receiving said interrupt, determining a cause for freezing said selected VL and performing a responsive action.

12. A computer program product as recited in claim 11 wherein the step of said firmware performing a responsive action includes the steps of said firmware performing an error recovery procedure (ERP) for the QP.

13. A computer program product as recited in claim 11 wherein the step of said firmware performing a responsive action includes the steps of said firmware updating a state for the QP.

14. A computer program product as recited in claim 11 wherein the step of said firmware performing a responsive action includes the steps of said firmware performing application unique processing for the QP.

15. A computer program product as recited in claim 11 further includes the steps responsive to said firmware performing said responsive action, of said firmware clearing said state bit for unfreezing said selected VL.

16. Apparatus for implementing a receive function over an interconnect network comprising:
   a packet disassembler for selecting a virtual lane (VL) with a pending packet for a queue pair (QP) and for checking for an exceptional condition for the pending packet;
   a queue pair context memory for storing an interrupt bit for firmware and a state bit for freezing each virtual lane (VL); and
   said packet disassembler responsive to identifying said exceptional condition for the pending packet, setting a state bit for freezing said selected VL; and generating an interrupt to firmware.

17. Apparatus for implementing a receive function over an interconnect network as recited in claim 16 wherein said firmware responsive to receiving said interrupt, for determining a cause for freezing said selected VL and for performing a responsive action.

18. Apparatus for implementing a receive function over an interconnect network as recited in claim 17 wherein said firmware performing said responsive action includes said firmware performing an error recovery procedure (ERP) for the QP.

19. Apparatus for implementing a receive function over an interconnect network as recited in claim 17 wherein said firmware performing said responsive action includes said firmware updating a state for the QP.

20. Apparatus for implementing a receive function over an interconnect network as recited in claim 17 wherein said firmware performing said responsive action includes said firmware performing application unique processing for the QP.

* * * * *